United States Patent
Holmqvist et al.

(10) Patent No.: US 8,125,489 B1
(45) Date of Patent: Feb. 28, 2012

(54) PROCESSING PIPELINE WITH LATENCY BYPASS

(75) Inventors: Peter B. Holmqvist, Cary, NC (US); Robert J. Stoll, Los Altos, CA (US); John A. Schachte, Cary, NC (US)

(73) Assignee: NVIDIA Corporation, Santa Clara, CA (US)

( * ) Notice: Subject to any disclaimer, the term of this patent is extended or adjusted under 35 U.S.C. 154(b) by 1124 days.

(21) Appl. No.: 11/532,760

(22) Filed: Sep. 18, 2006

(51) Int. Cl.
*G06F 13/14* (2006.01)

(52) U.S. Cl. ......... 345/519; 345/557; 345/552; 345/506

(58) Field of Classification Search .................. 345/501, 345/506, 544, 545, 555, 55, 557
See application file for complete search history.

(56) References Cited

U.S. PATENT DOCUMENTS

| | | | | |
|---|---|---|---|---|
| 6,741,259 B2 * | 5/2004 | Baker et al. | ..... | 345/582 |
| 6,924,810 B1 * | 8/2005 | Tischler | ..... | 345/541 |
| 6,972,769 B1 * | 12/2005 | Nebeker et al. | ..... | 345/552 |
| 7,633,506 B1 * | 12/2009 | Leather et al. | ..... | 345/506 |
| 2005/0122338 A1 * | 6/2005 | Hong et al. | ..... | 345/546 |
| 2005/0195200 A1 * | 9/2005 | Chuang et al. | ..... | 345/519 |
| 2005/0206648 A1 * | 9/2005 | Perry et al. | ..... | 345/557 |
| 2005/0219253 A1 * | 10/2005 | Piazza et al. | ..... | 345/557 |
| 2006/0149930 A1 * | 7/2006 | Murakami et al. | ..... | 712/218 |
| 2008/0117221 A1 * | 5/2008 | Hutchins et al. | ..... | 345/506 |

* cited by examiner

*Primary Examiner* — Daniel Washington
*Assistant Examiner* — Donna J Ricks
(74) *Attorney, Agent, or Firm* — Patterson & Sheridan, LLP (57) ABSTRACT

A processing pipeline employs one or more bypass caches to allow a transaction that is dependent on the results of a prior transaction to be processed before the prior transaction has completed processing. Each bypass cache is coupled to the input and the output of one of the sections of the processing pipeline so that results of a transaction from that section can be written into or read from the bypass cache as soon as that transaction has been completely processed through that section. With such a configuration, more transactions can be processed by the processing pipeline in a shorter amount of time. This is especially true for very deep pipelines.

16 Claims, 6 Drawing Sheets

PROCESSING PIPELINE WITH LATENCY BYPASS

FIELD OF THE INVENTION

The present invention relates generally to processing pipelines that employ caches to improve processing speeds, and more specifically to processing pipelines that employ bypass caches to further improve processing speeds.

BACKGROUND

Figure 1:
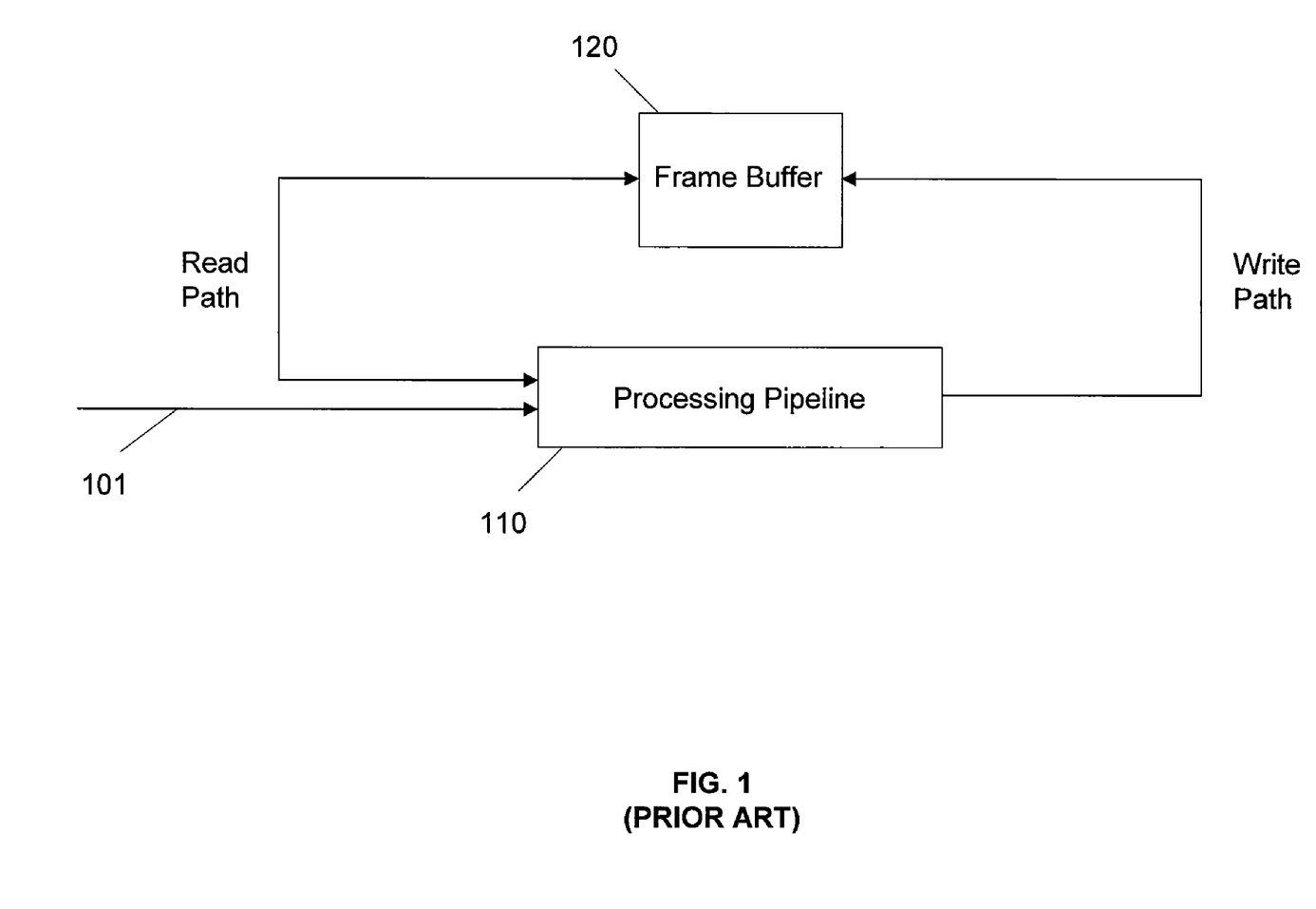
FIG. 1 illustrates a processing pipeline coupled to a frame buffer.

In graphics processing, frame buffers are used to store data that are needed by various graphics processing pipelines. An example of how a processing pipeline interfaces with a frame buffer is illustrated in FIG. 1. As shown in FIG. 1, a processing pipeline 110 receives a transaction 101 to be processed by it. It then reads data required by the transaction 101 from a frame buffer 120 and processes the transaction 101 using the data. After processing is complete, the processing pipeline 110 writes the results into the frame buffer 120. The time taken by the processing pipeline 110 to read data from and write data to memory, such as the frame buffer 120, is respectively known as the read latency and the write latency.

Figure 2:
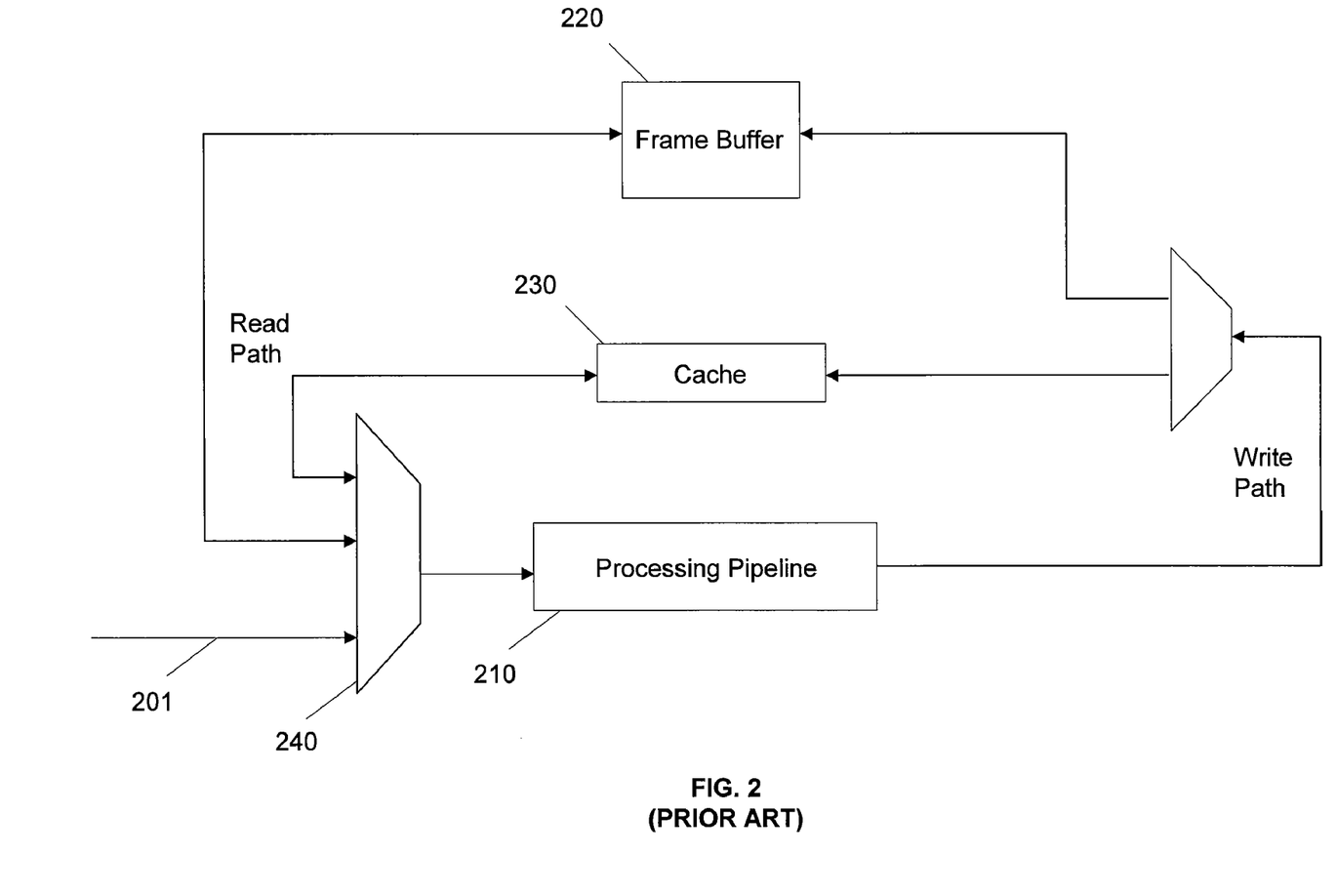
FIG. 2 illustrates a processing pipeline coupled to a frame buffer and a cache.

In order to reduce high latencies associated with frame buffer accesses, a cache is employed. The use of a cache is illustrated in FIG. 2. As shown in FIG. 2, a processing pipeline 210 receives a transaction 201 to be processed by it. It then reads data required by the transaction 201 from a cache 230 or a frame buffer 220. If the data is stored in the cache 230, it is read from the cache 230. Otherwise, it is read from the frame buffer 220. The processing pipeline 210 then processes the transaction 201 using the data. After processing is complete, the processing pipeline 210 writes the results into both the cache 230 and the frame buffer 220.

When a transaction depends on the results of a prior transaction, it is held at interlock 240 until the results of the prior transaction are written to the cache 230. Once this is done, the processing pipeline 210 reads that result and processes the transaction. In this particular example, the benefits of using the cache 230 are realized both on the write side (e.g., when the results of the prior transaction are written) and on the read side (e.g., when the results of the prior transaction are read).

The benefits of using a cache, however, are not as great if the processing pipeline latency is significant relative to the cache latency. The time taken by a processing pipeline to process a transaction, known as the processing latency, increases with the depth of the processing pipeline. A transaction that depends on the results of a prior transaction has to wait for the results to be output by the processing pipeline and, in such cases, any speed gains from using a cache are offset by the increased processing latency.

SUMMARY OF THE INVENTION

The present invention provides a processing pipeline that employs a bypass cache to improve processing speeds, especially for deep processing pipelines. According to embodiments of the present invention, bypass caches allow a transaction that is dependent on results of a prior transaction to be processed before the prior transaction has completed processing. As a result, more transactions can be processed by the processing pipeline in a shorter amount of time.

According to an embodiment of the present invention, a processing pipeline having multiple sections and coupled to a cache and a frame buffer is also coupled to a bypass cache. More specifically, the bypass cache is coupled to the input and the output of one of the sections of the processing pipeline so that transaction results of this section can be written to and read from the bypass cache to allow a transaction that is dependent on results of a prior transaction to be processed before the prior transaction has completed processing.

In some embodiments of the present invention, the processing pipeline having multiple sections is coupled to first and second bypass caches. Each bypass cache is coupled to the input and the output of one of the sections of the processing pipeline, and an interlock that is positioned directly upstream of the input of the corresponding section. The interlock holds a transaction that depends on results of a prior transaction until the results are available to be read by the transaction.

A bypass cache includes storage locations for storing a number of transaction results. In general, if the processing latency of a corresponding processing pipeline section is long, the bypass cache is configured with more storage locations. Transaction results written into the bypass cache are stored in the least recently used storage location of the bypass cache.

The present invention also provides a method of processing multiple transactions through a processing pipeline. In this method, transaction results from a processing pipeline section are stored in a bypass cache for use by a subsequent transaction. The method, according to an embodiment of the present invention, includes the steps of processing a first transaction through a processing pipeline, holding a second transaction prior to a section of the processing pipeline, and releasing the second transaction when the first transaction results are read from a bypass cache coupled to that section of the processing pipeline.

BRIEF DESCRIPTION OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DETAILED DESCRIPTION

Figure 3:
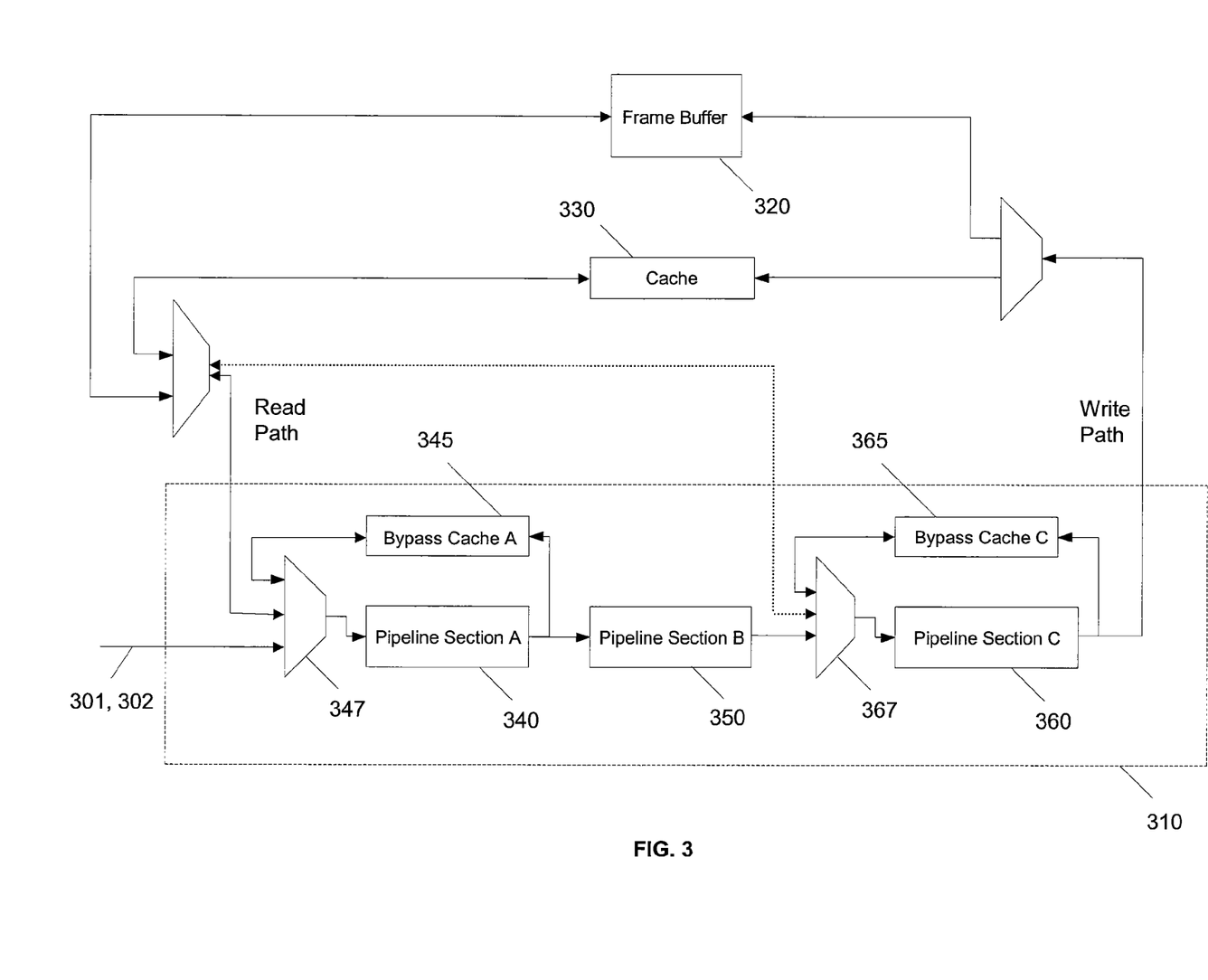
FIGS. 3 and 4 are examples of processing pipelines that employ bypass caches according to embodiments of the present invention.

FIG. 3 is an example of a processing pipeline 310 that employs bypass caches according to an embodiment of the present invention. The particular example given here is a depth raster operations pipeline (ZROP) 310 of a graphics processing unit that is coupled to a frame buffer 320 and a cache 330. The ZROP has pipeline sections A, B, and C. Pipeline section A 340 processes transactions on compressed z-data. Pipeline section B 350 processes transactions to decompress the compressed z-data. Pipeline section C 360 processes transactions on uncompressed z-data. Bypass cache A 345 stores transaction results of pipeline section A 340. Bypass cache C 365 stores transaction results of pipeline section C 360. Interlock A 347 holds a transaction that needs results of a prior transaction for it to be processed through pipeline section A 340. Interlock C 367 holds a transaction that needs results of a prior transaction for it to be processed through pipeline section C 360. Interlock A 347 also performs reads of data from frame buffer 320 and cache 330 when such data is required by a transaction that is to be passed through the processing pipeline 310 and is not available from either bypass cache A 345 or bypass cache C 365. Interlock A 347 will stall the transaction until the required data becomes available from either frame buffer 320 or cache 330.

In operation, a transaction 301 enters the processing pipeline 310. If transaction 301 needs the results of a prior transaction for it to be processed through pipeline section A 340, transaction 301 is held at interlock A 347 until the needed data is available to be read in any one of bypass cache A 345, cache 330 or frame buffer 320. When the prior transaction completes processing through pipeline section A 340, its results are stored in bypass cache A 345 and it proceeds down to pipeline section B 350 and then to pipeline section C 360. After the prior transaction is processed through the entire processing pipeline 310, the final results are written into bypass cache C 365, cache 330, and frame buffer 320.

The data that transaction 301 needs may be found in any one of bypass cache A 345, cache 330 or frame buffer 320. If the needed data is found in bypass cache A 345, transaction 301 can be immediately passed through interlock A 347 to pipeline section A 340 for processing without waiting for the prior transaction to be processed through the entire processing pipeline 310. Thus, by employing the bypass cache A 345 and interlock A 347, transaction 301 is allowed to be processed through pipeline section A 340 as soon as the prior transaction completes its processing through pipeline section A 340 and writes the results thereof into bypass cache A 345. If bypass cache A 345 and interlock A 347 are not used and only cache 230 and interlock 240 are used, as shown in FIG. 2, transaction 301 will need to wait until the prior transaction completes its processing through the entire processing pipeline 310 before transaction 301 can proceed through the processing pipeline 310.

A transaction that does not need the results of any prior transaction for it to be processed through pipeline section A 340, e.g., transaction 302, is not held at interlock A 347 and is passed to pipeline section A 340 and then to pipeline section B 350 for processing. When transaction 302 reaches interlock C 367, it is held there if it needs the results of a prior transaction for it to be processed through pipeline section C 360 until the needed data is available to be read in the bypass cache C 365. By employing the bypass cache C 365 and interlock C 367, transaction 302 is allowed to be processed through pipeline section A 340 and pipeline section B 350 right after the prior transaction is processed through them. If bypass cache C 365 and interlock C 367 are not used and only cache 230 and interlock 240 are used, as shown in FIG. 2, transaction 302 will need to wait until the prior transaction completes its processing through the entire processing pipeline 310 before transaction 302 can proceed through the processing pipeline 310.

Bypass cache A 345 and bypass cache C 365 are configured as miniature caches that store a limited number of transaction results. This number in the embodiments of the present invention is 4, but can be increased or decreased depending on the processing latency of the corresponding pipeline section. In general, if the processing latency is longer, a larger number is used.

Transaction results from pipeline section A 340 and pipeline section C 360 are stored in the least recently used storage locations of bypass cache A 345 and bypass cache C 365, respectively. As a result, if a transaction 301, 302 is dependent on a prior transaction that is more than 4 transactions ahead of it, the bypass caches will not contain the data needed by transaction 301, 302. In such cases, transaction 301, 302 is held at interlock A 347 until the data needed by transaction 301, 302 is available in cache 330 or frame buffer 320 and read from one of these locations.

In alternative embodiments, a read path from frame buffer 320 and cache 330 to interlock C 367 may be provided. This read path is shown as a dotted line in FIG. 3. This read path permits the reading of the data that is needed by pipeline section C 360 but not stored in bypass cache C 365 to occur at the interlock C 367 instead of interlock A 347. As a result, the transaction that requires such data can be stalled at interlock C 367 instead of interlock A 347.

Figure 4:
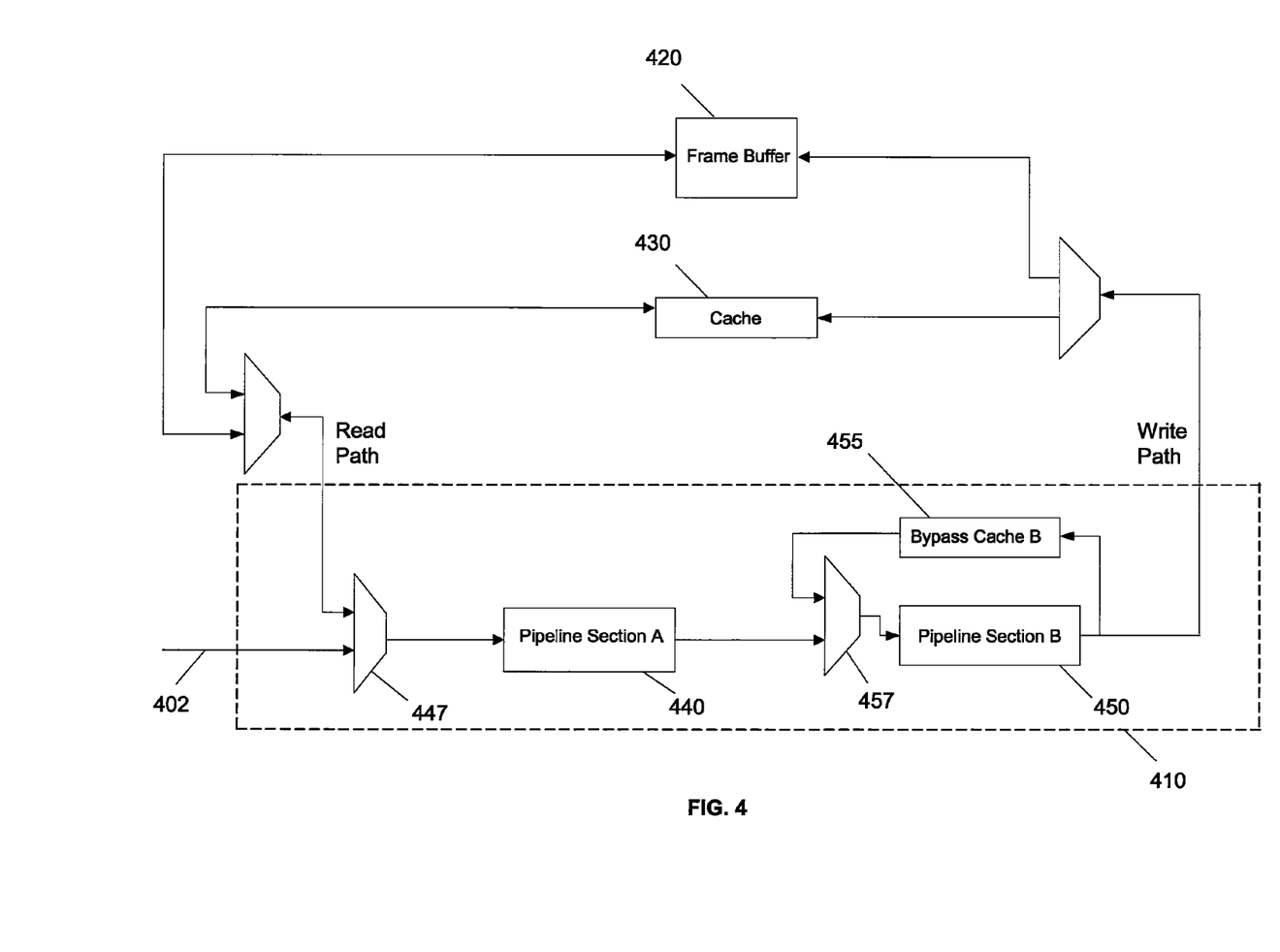

FIG. 4 is an example of a processing pipeline 410 that employs a bypass cache according to another embodiment of the present invention. The particular example given is a color raster operations pipeline (CROP) 410 of a graphics processing unit that is coupled to a frame buffer 420 and a cache 430. Pipeline section A 440 processes color transactions, and pipeline section B 450 processes blend transactions. Bypass cache B 455 stores transaction results from pipeline section B 450. The bypass cache B 455 is configured as a miniature cache and sized to store 10 transaction results. Interlock A 447 holds a transaction that needs results of a prior transaction for it to be processed through pipeline section A 440. Interlock B 457 holds a transaction that needs results of a prior transaction for it to be processed through pipeline section B 450. Interlock A 447 also performs reads of data from frame buffer 420 and cache 430 when such data is required by a transaction that is to be passed through the processing pipeline 410 and is not available from bypass cache B 455. Interlock A 447 will stall the transaction until the required data becomes available from either frame buffer 420 or cache 430.

In operation, a transaction 402 enters the processing pipeline 410. If transaction 402 needs the results of a prior transaction for it to be processed through pipeline section A 440, transaction 402 is held at interlock A 447 until the needed data is available to be read in either cache 430 or frame buffer 420. When the prior transaction completes processing through the entire pipeline 410, its results are written into cache 430 and frame buffer 420. Then, the results of the prior transaction are read from cache 430 or frame buffer 420, and transaction 402 is passed though interlock A 447 to pipeline section A 440 for processing. If, on the other hand, transaction 402 does not need the results of a prior transaction for it to be processed through pipeline section A 440, it is passed though interlock A 447 to pipeline section A 440 for processing.

When transaction 402 reaches interlock B 457, it is held there if it needs the results of a prior transaction for it to be processed through pipeline section B 450 until the needed data is available in bypass cache B 455. By employing the bypass cache B 455 and interlock B 457, transaction 402 is allowed to be processed through pipeline section A 440 right after the prior transaction is processed through it. If bypass cache B 455 and interlock B 457 are not used and only cache 230 and interlock 240 are used, as shown in FIG. 2, transaction 402 will need to wait until the prior transaction completes its processing through the entire processing pipeline 410 before transaction 402 can proceed through the processing pipeline 410.

Figure 5:
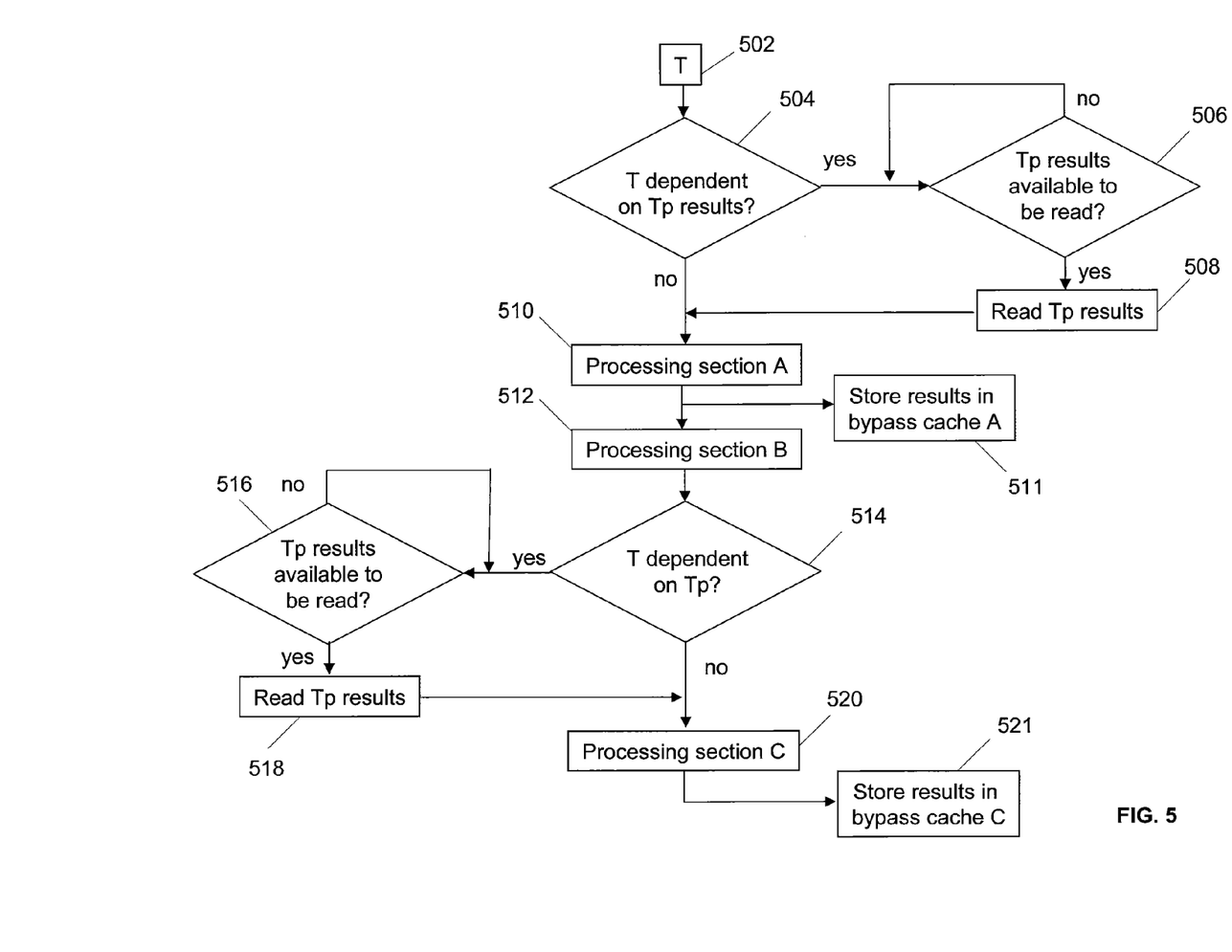
FIG. 5 is a flow diagram that illustrates the operation of a processing pipeline coupled to bypass caches shown in FIG. 3.

FIG. 5 is a flow diagram that illustrates the operation of a processing pipeline coupled to bypass caches shown in FIG. 3. In step 502, a transaction, T, enters the processing pipeline 310. In step 504, it is determined if the transaction needs the results of any prior transaction, Tp, for it to be processed through pipeline section A 340. If the condition of step 504 is true, the transaction is held at interlock A 347 until the results needed by the transaction are stored in the bypass cache 345, the cache 330, or the frame buffer 320 (step 506). When the results needed by the transaction become available, they are read in step 508 and flow proceeds to step 510, where the transaction is passed to pipeline section A 340 for processing. If the condition of step 504 is false, the flow proceeds directly to step 510. After processing the transaction in pipeline section A 340, the transaction result is written into a storage location of bypass cache A 345 that is least recently used, for possible use by a subsequent transaction (step 511).

After step 510, the transaction is passed to pipeline section B 350 for processing (step 512). Then, in step 514, it is determined if the transaction needs the results of any prior transaction, Tp, for it to be processed through pipeline section C 360. If the condition of step 514 is true, the transaction is held at interlock C 367 until the results needed by the transaction are stored in the bypass cache 365 (step 516). When the results needed by the transaction become available, they are read in step 518 and flow proceeds to step 520, where the transaction is passed to pipeline section C 360 for processing. If the condition of step 514 is false, the flow proceeds directly to step 520. After processing the transaction in pipeline section C 360, the transaction result is written into a storage location of bypass cache C 365 that is least recently used, for possible use by a subsequent transaction (step 521).

Figure 6:
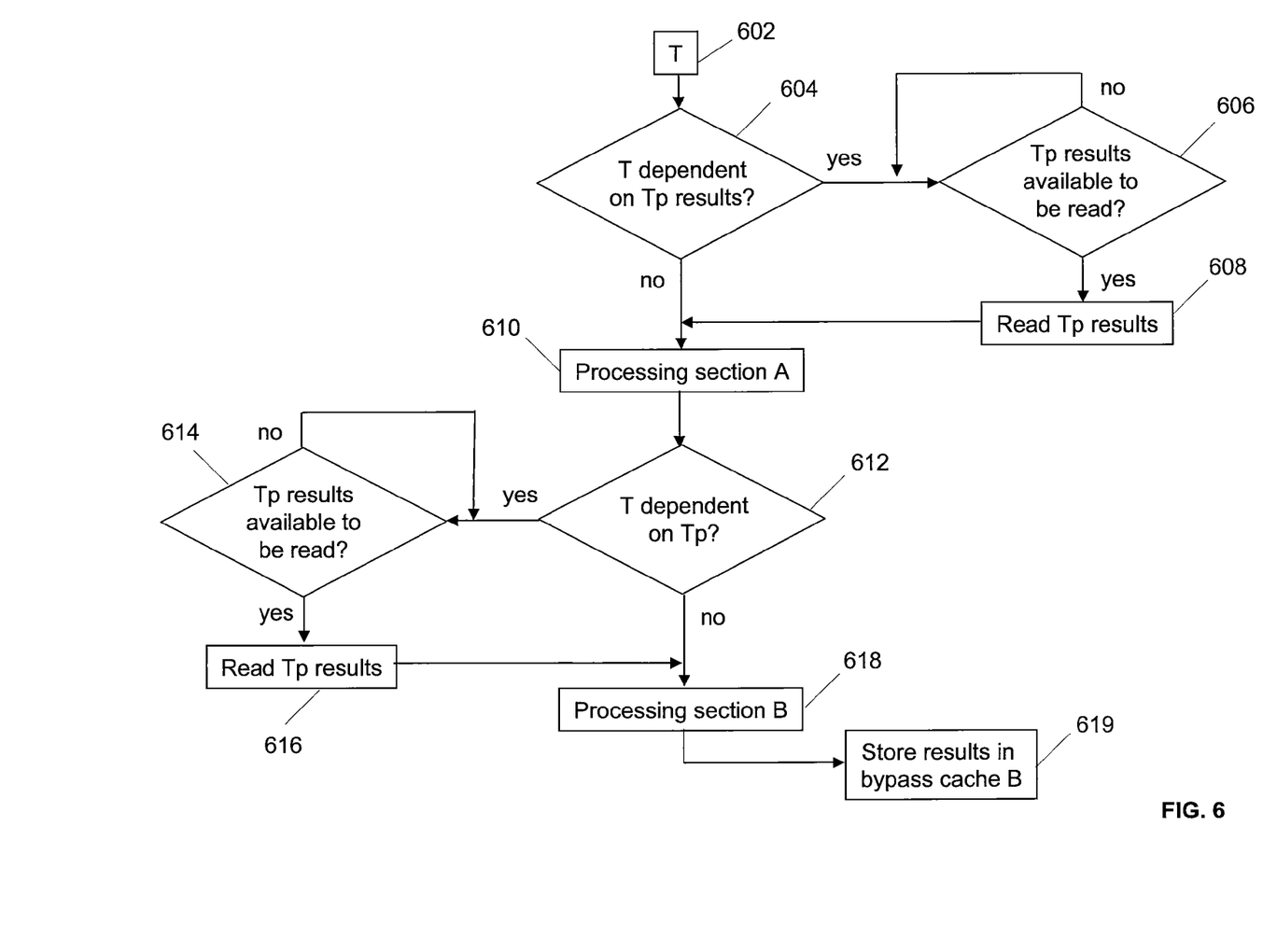
FIG. 6 is a flow diagram that illustrates the operation a processing pipeline coupled to a bypass cache shown in FIG. 4.

FIG. 6 is a flow diagram that illustrates the operation of a processing pipeline coupled to a bypass cache shown in FIG. 4. In step 602, a transaction, T, enters the processing pipeline 410. In step 604, it is determined if the transaction needs the results of any prior transaction, Tp, for it to be processed through pipeline section A 440. If the condition of step 604 is true, the transaction is held at interlock A 447 until the results needed by the transaction is stored in the cache 430 or the frame buffer 420 (step 606). When the results needed by the transaction become available, they are read in step 608 and flow proceeds to step 610, where the transaction is passed to pipeline section A 440 for processing. If the condition of step 604 is false, the flow proceeds directly to step 610.

After step 610, it is determined if the transaction needs the results of any prior transaction, Tp, for it to be processed through pipeline section B 450 (step 612). If the condition of step 612 is true, the transaction is held at interlock B 457 until the results needed by the transaction are stored in the bypass cache B 455 (step 614). When the results needed by the transaction becomes available, they are read in step 616 and flow proceeds to step 618, where the transaction is passed to pipeline section B 450 for processing. If the condition of step 612 is false, the flow proceeds directly to step 618. After processing the transaction in pipeline section B 450, the transaction result is written into a storage location of bypass cache B 455 that is least recently used, for possible use by a subsequent transaction (step 619).

While foregoing is directed to embodiments in accordance with one or more aspects of the present invention, other and further embodiments of the present invention may be devised without departing from the scope thereof, which is determined by the claims that follow. Claims listing steps do not imply any order of the steps unless such order is expressly indicated.

What is claimed is:

1. A processing unit coupled to a frame buffer and configured to read data from and write data to the frame buffer, the processing unit comprising:

a processing pipeline having multiple sections, the multiple sections including at least a first section and a second section;

a first cache coupled to the input and the output of the processing pipeline, wherein results for transactions having completed processing through the processing pipeline are stored in and retrieved from the first cache;

a second cache coupled to the input and the output of the first section; and a third cache coupled to the input and the output of the second section, wherein first data generated by a first transaction upon completion of processing in the first section is written to the second cache and is transmitted from the output of the first section to the input of the second section, wherein second data generated by the first transaction upon completion of processing in the second section is written to the frame buffer, the first cache, and the third cache, wherein a second transaction requiring the first data for processing and subsequently entering the first section receives the first data from the second cache if the first data is available in the second cache, receives the first data from the first cache if the first data is not available in the second cache and is available in the first cache, and receives the first data from the frame buffer if the first data is not available in either the second cache or the first cache, and wherein the second transaction requiring the second data for processing and subsequently entering the second section receives the second data from the third cache if the data is available in the third cache, receives the data from the first cache if the data is not available in the third cache and is available in the first cache, and receives the data from the frame buffer if the data is not available in either the third cache or the first cache.

2. The processing unit according to claim 1, further comprising an interlock positioned directly upstream of the input of the first section for holding a transaction that depends on transaction results from a prior transaction, and permitting said transaction to proceed through the first section when the prior transaction is processed through the first section and said transaction results from the prior transaction are stored in the second cache.

3. The processing unit according to claim 2, wherein the second cache is configured to store transaction results from a multiple number of prior transactions processed through the first section, and the transaction results from the most recent of the prior transactions processed through the first section are stored in the least recently used location of the second cache.

4. The processing unit according to claim 3, wherein the third cache is configured to store transaction results from a multiple number of prior transactions processed through the second section, and the transaction results from the most recent of the prior transactions processed through the second section are stored in the least recently used location of the third cache.

5. The processing unit according to claim 1, further comprising:

a first interlock positioned directly upstream of the input of the first section for holding a transaction that depends on transaction results from a prior transaction, and permitting said transaction to proceed through the first section when the prior transaction is processed through the first section and said transaction results from the prior transaction are stored in the second cache; and a second interlock positioned directly upstream of the input of the second section for holding a transaction that depends on transaction results from a prior transaction, and permitting said transaction to proceed through the second section when the prior transaction is processed through the second section and said transaction results from the prior transaction are stored in the third cache.

6. The processing unit according to claim 1, wherein the multiple sections include a third section that is intermediate said first section and the second section.

7. The processing unit according to claim 1, wherein the processing pipeline comprises a pixel processing pipeline.

8. The processing unit according to claim 1, wherein the first section comprises a pipeline section that processes transactions on uncompressed z-data and the second section comprises a pipeline section that processes transactions on compressed z-data.

9. The processing unit according to claim 1, wherein the first section comprises a pipeline section that processes blend transactions and the second section comprises a pipeline section that processes color transactions.

10. A computing device comprising:
a memory unit; and
a processing unit coupled to the memory unit and configured to read data from and write data to the memory unit, wherein the processing unit includes a raster operations unit having a pixel processing pipeline with multiple sections including at least a first section and a second section, a first cache coupled to the input and the output of the pixel processing pipeline, wherein results for transactions having completed processing through the pixel processing pipeline are stored in and retrieved from the first cache, a second cache coupled to the input and the output of the first section, and a third cache coupled to the input and the output of the second section,
wherein first data generated by a first transaction upon completion of processing in the first section is written to the second cache and is transmitted from the output of the first section to the input of the second section,
wherein second data generated by the first transaction upon completion of processing in the second section is written to the memory unit, the first cache, and the third cache,
wherein a second transaction requiring the first data for processing and subsequently entering the first section receives the first data from the second cache if the first data is available in the second cache, receives the first data from the first cache if the first data is not available in the second cache and is available in the first cache, and receives the first data from the memory unit if the first data is not available in either the second cache or the first cache, and
wherein the second transaction requiring the second data for processing and subsequently entering the second section receives the second data from the third cache if the data is available in the third cache, receives the data from the first cache if the data is not available in the third cache and is available in the first cache, and receives the data from the memory unit if the data is not available in either the third cache or the first cache.

11. The computing device according to claim 10, wherein the second cache is configured to store transaction results from a multiple number of prior transactions processed through the second section, and the transaction results from the most recent of the transactions processed through the second section are stored in the least recently used location of the second cache.

12. The computing device according to claim 11, wherein the third cache is configured to store transaction results from a multiple number of prior transactions processed through the second section, and the transaction results from the most recent of the transactions processed through the second section are stored in the least recently used location of the third cache.

13. The computing device according to claim 10, further comprising:
a first interlock positioned directly upstream of the input of said one of the multiple sections; and
a second interlock positioned directly upstream of the input of said another one of the multiple sections,
wherein the first interlock is configured to hold a first transaction from passing through to said one of the multiple sections if said first transaction is dependent on transaction results of a prior transaction, and the second interlock is configured to hold a second transaction from passing through to said another one of the multiple sections if said second transaction is dependent on transaction results of a prior transaction.

14. The computing device according to claim 13, wherein the memory unit comprises a frame buffer and the transaction results of the pixel processing pipeline are stored in the frame buffer.

15. The computing device according to claim 14, wherein the pixel processing pipeline includes a third section that is intermediate said one of the multiple sections and said another one of the multiple sections.

16. The computing device according to claim 10, wherein the processing unit comprises a graphics processing unit and the memory unit comprises a frame buffer.

* * * * *